US009613364B2

(12) United States Patent
Riley

(10) Patent No.: US 9,613,364 B2
(45) Date of Patent: Apr. 4, 2017

(54) METHOD AND SYSTEM OF IDENTIFYING A CONCEPT OF A GOOD OR SERVICE FOR AN UNMET MARKET POTENTIAL

(71) Applicant: James H. Riley, San Francisco, CA (US)

(72) Inventor: James H. Riley, San Francisco, CA (US)

(*) Notice: Subject to any disclaimer, the term of this patent is extended or adjusted under 35 U.S.C. 154(b) by 245 days.

(21) Appl. No.: 14/336,422

(22) Filed: Jul. 21, 2014

(65) Prior Publication Data

US 2015/0278833 A1  Oct. 1, 2015

Related U.S. Application Data

(60) Provisional application No. 61/971,796, filed on Mar. 28, 2014.

(51) Int. Cl.
  *G06Q 30/02* (2012.01)
(52) U.S. Cl.
  CPC .................. *G06Q 30/0202* (2013.01)
(58) Field of Classification Search
  CPC ................................... G06Q 30/0202
  USPC .......................................... 707/728
  See application file for complete search history.

(56) References Cited

U.S. PATENT DOCUMENTS

| | | | | |
|---|---|---|---|---|
| 8,301,639 B1* | 10/2012 | Myllymaki | ......... | G06F 17/3097 707/748 |
| 8,566,029 B1* | 10/2013 | Lopatenko | ......... | G08G 1/0962 701/400 |
| 2002/0123994 A1* | 9/2002 | Schabes | ............. | G06F 17/3061 |
| 2003/0131319 A1 | 7/2003 | Hintz | | |
| 2004/0015481 A1 | 1/2004 | Zinda | | |
| 2004/0186738 A1 | 9/2004 | Reisman | | |
| 2004/0249700 A1 | 12/2004 | Gross | | |
| 2005/0246358 A1 | 11/2005 | Gross | | |
| 2005/0289103 A1* | 12/2005 | Bier | .................... | G06F 17/3064 |
| 2007/0033040 A1* | 2/2007 | Huang | ................ | G06F 17/2755 704/254 |
| 2007/0219993 A1* | 9/2007 | Laker | ................ | G06F 17/30864 |
| 2012/0166413 A1* | 6/2012 | LeBaron | ............ | G06Q 30/0246 707/709 |
| 2016/0048876 A1* | 2/2016 | Murphy | ............ | G06F 17/30241 705/14.58 |

* cited by examiner

*Primary Examiner* — Mark E Hershley
*Assistant Examiner* — Hicham Skhoun

(57) ABSTRACT

A computing device is configured to identify a concept of a good or service for an unmet market potential. A Global User Search Data file (GUSD) comprising information related to a search object is read. A morpheme combination in the search object from the GUSD is identified. The morpheme combination is compared to a first set of pre-existing terms. A first score is assigned to the search object based on the comparison, wherein a higher first score is assigned if the morpheme combination is not found in the first set of pre-existing terms. An un-successfulness of the search object is determined and a second score is assigned, wherein a higher second score is assigned the more un-successful the search object is. An aggregate of all the scores for a search term is compared to a predetermined threshold. If the aggregate score is above the predetermined threshold, the search term is identified as a concept of a good or service for an unmet market potential.

7 Claims, 8 Drawing Sheets

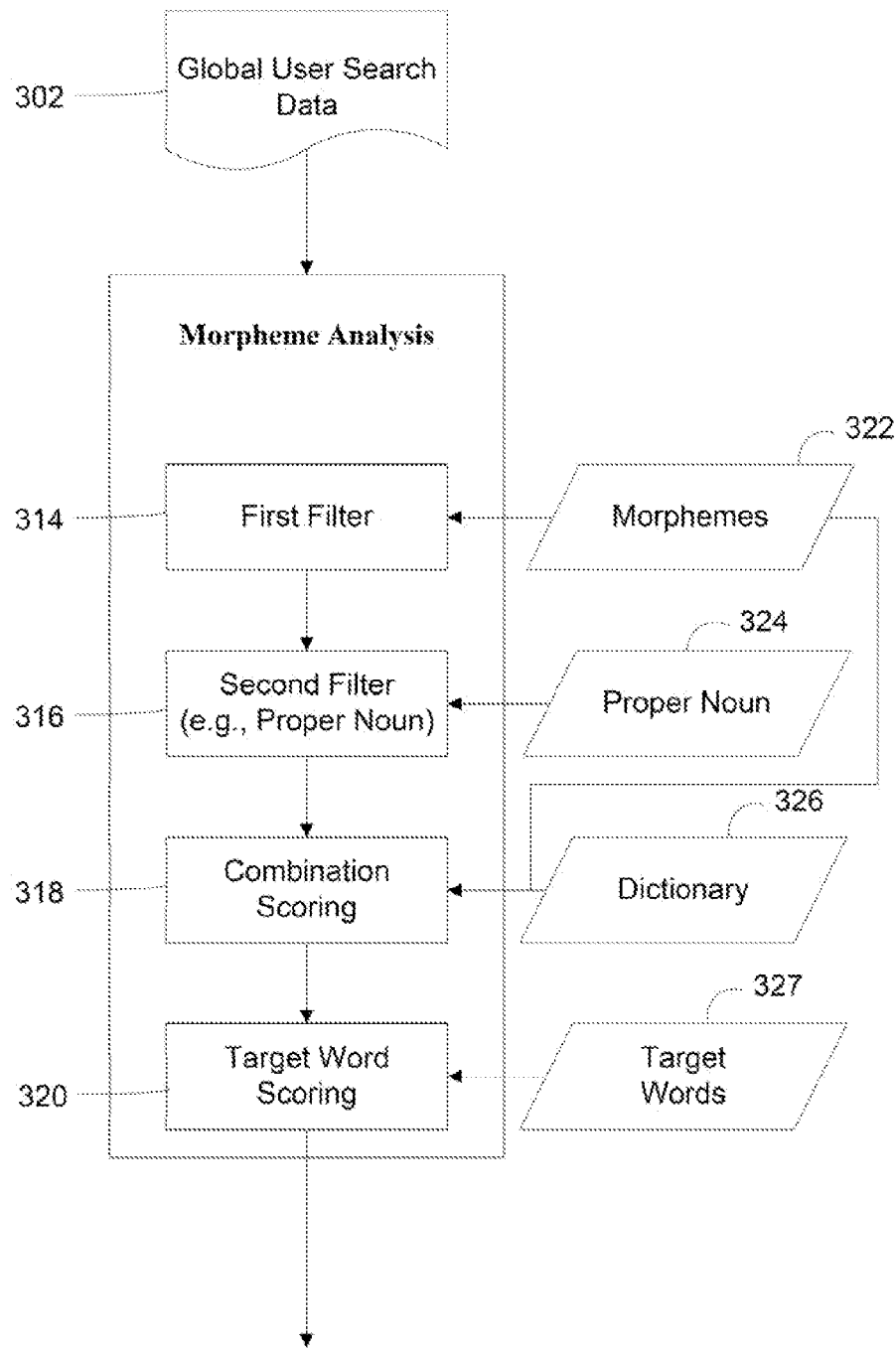
FIG. 3a    Frequency and Location Analysis

Global User Search Data

| Searched Phrase as Entered by User | User ID | Location | Avg. Quality of Top Results | Results Clicked | Time |
|---|---|---|---|---|---|
| "directions to Hawthorne Mall" | 0000 | 90041 | 35 | 1 | 18:14:30:10:02 |
| "how many calories are in an apple?" | 0001 | 33292 | 23 | 5 | 18:22:19:10:02 |
| "computer with two headphone jacks" | 0002 | 39448 | 10 | 0 | 18:32:56:10:02 |
| "is there a fat-handle toothbrush?" | 0003 | 19284 | 86 | 1 | 19:11:23:10:02 |
| ... | ... | ... | ... | ... | ... |
| "is there a double-headphone computer?" | 6945 | 89443 | 11 | 0 | 10:48:21:10:06 |
| ... | ... | ... | ... | ... | ... |
| "nike commercial" | 9999 | 55612 | 89 | 4 | 11:12:05:10:09 |

*FIG. 6*

METHOD AND SYSTEM OF IDENTIFYING A CONCEPT OF A GOOD OR SERVICE FOR AN UNMET MARKET POTENTIAL

CROSS-REFERENCES TO RELATED APPLICATIONS

The present application claims the benefit of priority from U.S. Provisional Patent Application Ser. No. 61/971,796, filed on Mar. 28, 2014, which is hereby incorporated by reference in its entirety for all purposes.

BACKGROUND

The Web has evolved into a favorite search tool. Individuals using the Web can search for goods and services that are of interest. Industries and businesses are generally interested in such searches because the queries highlight products and services that are presently in demand. For example, a large volume of searches related to a product indicates to a provider that additional units of this product should be stocked to meet the demand.

While data harvesting of Web searches presently exist, there is no effective way to identify special searches (from the countless performed every day) that may lead to new ideas. Identifying concepts, products, and services that are at the cusp of creation would provide an advantage over potential competitors.

Accordingly, what is needed is a system for identifying concepts, products, and services from Web searches before they exist in the market-place.

BRIEF DESCRIPTION OF THE DRAWINGS

FIGS. 3a to 3d illustrate more detailed exemplary flow-charts of different aspects of search data analysis.

FIG. 6 illustrates an exemplary table of a Global User Search Data file, consistent with an exemplary embodiment.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein generally relate to identifying a concept of a good or service for an unmet market potential based on internet search terms. Potential solutions may be provided in terms of new concepts, products, services, or improvements thereof. Internet searches performed by users are analyzed for predetermined features. Multiple stages of data analysis are performed in which data is filtered based on the morpheme content and quality of search results, and user response to these results. Score is awarded at various stages of analysis and filtration based on predetermined criteria. The search object that results in an aggregated high score provides insight into concepts, products, services, or improvements thereof that are at the cusp of creation.

Figure 1:
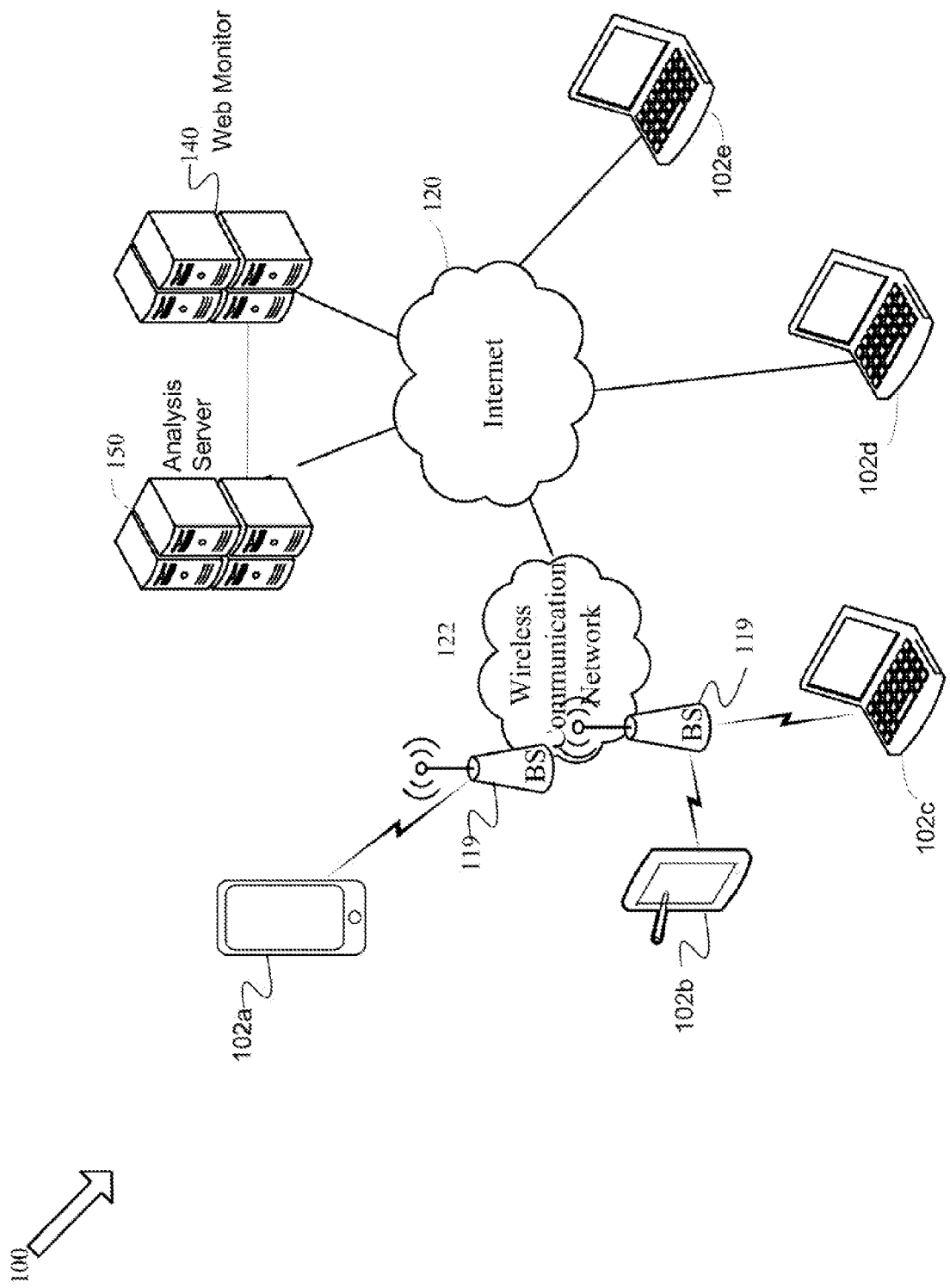
FIG. 1 illustrates an exemplary system for monitoring Web search objects and analyzing their content to provide insight into emerging concepts, products, services, or improvement thereof.

Reference now is made in detail to the examples illustrated in the accompanying drawings and discussed below. FIG. 1 illustrates a number of computing devices (102a to 102e) that are configured to communicate via the internet 120. In various embodiments, the computing devices (102a to 102e) may communicate with the internet 120 either directly or through a wireless communication network 122 via base stations 119. While FIG. 1 illustrates a wireless communication network 122 by way of example, it will be understood that a wired communication between the computing devices 13a to 13d and the internet 120 is supported as well.

For purposes of later discussion, several computing devices (e.g., 102a to 102e) appear in the drawing, to represent examples of the computing devices that may send queries (i.e., search objects) through the internet 120. Today, computing devices may be mobile and may take the form of portable handsets, smart-phones, tablet computers, laptop or other portable personal computers (PCs), or personal digital assistants (PDAs). Of course, they may be implemented in other form factors, including various types of consumer and business electronic devices. The computing devices 102a to 102e, for example, may take the form of a smart phone 102a, tablet 102b, laptop 102c, desktop, etc. The system 100 allows users of the computing devices to initiate communication, and receive information from the internet 120. Each computing device may be in a different location (e.g., have a different zip code) and a different internet protocol (IP) address.

FIG. 1 includes a server 140, referred herein as a "web monitor," which monitors the searches performed by the computing devices 102a to 102e. In one embodiment, the web monitor 140 reads the search object received from a computing device (e.g., 102e) and searches for information on the Web to accommodate the query. The search results are then presented by the web monitor 140 in a line of results, sometimes referred to as search engine results pages (SERPs), to the computing device (e.g., 102e) performing the query over the internet 120. Web monitor 140 receives the search object of a query performed by a computing device and is configured to search the Web. In one embodiment, the web monitor 140 is also configured to collect, measure, and analyze the search objects and the quality of the search results, which is discussed in more detail in a later section.

In one embodiment, the web monitor 140 identifies the popularity of web sites and individual pages that are returned in response to a Web search (e.g., SERPs). The popularity may be provided by a log file either in the web monitor 140 or another provider of such service. The web monitor 140 also determines the quality of the individual and aggregate (e.g., average) of the search results by known success metrics. The set of data collected by the web monitor 140 from the computing devices (e.g., 102a to 102e) querying the Web creates a set of search data, referred herein as a Global User Search Data file (GUSD). In this regard, FIG. 6 illustrates an exemplary table of a GUSD.

For each query, the search data includes (but is not limited to) one or more of the following: (1) the search object (e.g., phrase(s) searched), the location (e.g., zip code or IP address) from which the search was performed, (2) Average Quality of Top Results (AQTR), (3) User ID (e.g., an arbitrary number assigned to each IP address) to indicate when searches are conducted by the same user, or to identify other searches conducted by the same user over a predetermined time period), (4) SERP selected (e.g., clicked), (5) the number of results clicked, (6) time stamp (which can be used to calculate the lag between similar searches), (7) quality (and/or average quality) of the search result, etc.

In one embodiment, system 100 includes an analysis server 150, which analyzes the information harvested by the web monitor 140. The analysis server 150 may receive the harvested information from the web monitor in electronic form either through the internet 120 or directly (e.g., intranet, physical transfer through storage media, etc.).

The analysis server 150 is configured to perform various functions on the information received (i.e., GUSD) from the web monitor 140, including functions related to the following analysis: morpheme; frequency; location; quality of search results; etc. The actual analysis performed by the web monitor 140 and analysis server 150 is described in a later section.

Each of the servers 140 and 150 may be implemented in a distributed fashion on a number of similar platforms, to distribute the processing load and/or to provide effective analysis of the search objects harvested from computing devices 102a to 102e. As illustrated in FIG. 1, each of the web monitor 140 and analysis server 150 can be stand-alone or combined on a single server. Thus, the functionality described herein with respect to each of the servers 140 and 150 can also be provided by one or multiple different servers. In other words, the functions of the web monitor 140 and the analysis server 150 need not be distributed on various computing devices; rather, they may be combined on a stand-alone computing device.

Figure 2:
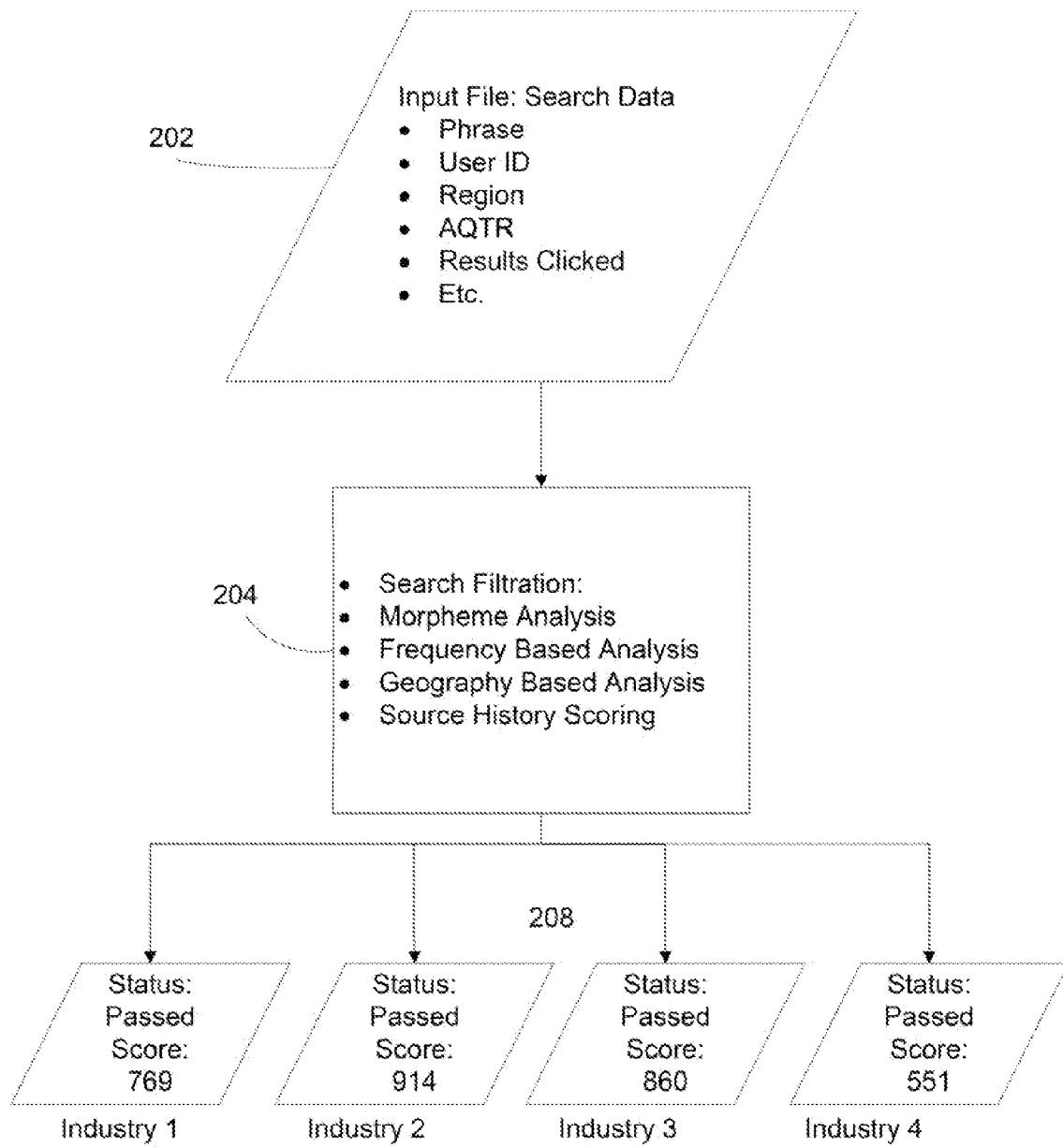
FIG. 2 illustrates a high level flow-chart of search data analysis of an exemplary embodiment.

With the foregoing overview of the system 100, it may be helpful now to consider a high-level discussion of the functions performed by the web monitor and analysis server 150. To that end, FIG. 2 illustrates a high level flow-chart of search data analysis of an exemplary embodiment. FIG. 2 illustrates a data gathering stage 202 and a filtration stage 204. Ultimately, scores given to relevant web search objects that were performed by users through their computing devices at various analysis/filtration steps. An aggregate score that is above a predetermined threshold indicates a possible point of novelty and/or market need.

In the first step 202, search objects from a set of individual Web search queries are compiled into the GUSD discussed above. The GUSD may be compiled based on volume (e.g., thousand search objects) or time (e.g., every week). The criteria (e.g., parameters) for the selection may be modified to identify different types of market needs and/or solutions. In one embodiment, the input file of step 202 is generated by the web monitor 140. The rules relating to the preassembly of the GUSD may be tailored for the output desired and described in a rules file (e.g., "Description of Files" in the web monitor 104).

The data gathering stage 202 in connection with the GUSD is followed by various filtration steps in stage 204. In the filtration stage 204, multiple stages of analysis are performed through which the searched phrase and its corresponding data are analyzed. In one embodiment, the analysis server 150 receives the input file from the web monitor 140.

In each filtration stage, a search object is awarded a score if it meets predetermined criteria, which can be adjusted for each type of result desired. For example, the more criteria met, the higher the score. Further, the score may be reset to zero if it demonstrates a disqualifying trait. For example, if searches relating to the availability of mobile device apps are not of interest, any search performed by a user that relates to a mobile app is attributed a disqualifying score (e.g., 0, or −1). Searches that yield scores that are disqualified are discarded (or simply not filtered further). The searches with the highest aggregate scores are later ranked. In one embodiment the GUSD data structure (e.g., table 6) is reordered based on total aggregate score. If the score is above a predetermined threshold, it is marked as a potential point of novelty and/or market demand and processed further. Scores that are at or below the predetermined threshold may be disregarded, In one embodiment, the results are sorted by industry. Different thresholds may be set for different industries. For example, a saturated industry may require a higher score while an emerging industry may be set to a lower threshold. By lowering the threshold, more results are available for further processing.

By way of example, step 208 of FIG. 2 illustrates the results of several search objects that have passed a predetermined threshold (e.g., 550). These search objects may be ranked dynamically by adding points to the search's score. A file (or array) (e.g., "SCORES") is initiated (e.g., by the analysis server 150) at the beginning of the scoring process. In one implementation, the scoring starts as a list of zeros with as many zeros as the number of searches in the GUSD table. The first number in SCORES array corresponds to the first search in the GUSD and so forth. As discussed herein, at a given stage of the scoring process, points are added to the nth score in the SCORES array if the nth search in GUSD meets the given criteria. In one embodiment, after the scoring is complete, the method enters a sorting stage. During sorting, the top elements in the SCORES array (i.e., those having the highest aggregate score) are ranked with the top performing searches in the GUSD. For example, if the $756^{th}$ score is the highest, the $756^{th}$ search in the GUSD is selected as the top result and saved as the first element in the global output file and in its industry-specific output file) The separation of the files in step 208 indicates that the analyzed search objects can be separated based on industry.

In various embodiments, the filtration may be modified to generate different assemblies of searches. For example, more common vs. less common products and/or ideas may receive a higher score. Different locations may be attributed higher scores. A more concentrated location (e.g., region) may receive more points than a less concentrated geographic region. For example, if ideas from Manhattan and Miami are valued more than those of another city, higher scores are assigned to the preferred locations (e.g., regions). In one embodiment, negative points are given for specific locations to exclude ideas therefrom. According, the filtration in step 204 may target searches that pertain to specific markets. In one embodiment, the filtration of step 204 is performed by analysis server 150.

The filtration of stage 204 includes one or more of the following steps: (1) Morpheme Analysis; (2) Frequency and Location Analysis; (3) Search Unsuccessfulness Analysis; and (4) User History Scoring. In various embodiments, these steps may be performed in different order. Each step is discussed in more detail below.

FIGS. 3a to 3d illustrate more detailed flow-charts of different aspects of search data analysis of an exemplary embodiment. The method is divided into multiple stages that can be performed in different order.

In step 302 of FIG. 3a, the first stage commences with receiving the GUSD. As discussed above, users using various computing devices have searched the Web for information. Their queries were collected, measured, and analyzed based on predetermined criteria, such as the phrase used, location of the search performed, location of the search targeted, AQTR, whether the results were clicked, quality of the results obtained, etc. This analysis may be performed by the web monitor 140. The gathered information in form of a GUSD data file may be sent (e.g., electronically) to the analysis server 150 for further analysis. Alternatively, the analysis may be performed directly by the web monitor 140.

In step 312, morpheme-based analysis is performed on the search object. A morpheme is the smallest lexical unit in a language, any series of letters that carries established meaning, including all complete words as well as prefixes, suffixes, conjugative indicators, etc. The file including the list of morphemes, "MORPHEMES," (as well as the file of dictionary words "DICTIONARY") may also include commonly used slang and product words that may not exist in a standard dictionary.

In step 314, searches having a morpheme combination that are not deemed sensible are filtered out. Put differently, if any character in the searched phrase string is not part of a substring that includes an element in morphemes, the search object is deemed not sensible and therefore discarded. In one embodiment the MORPHEMES file includes an array of morphemes that are found in the English language. For every series of consecutive letters of terms found in the search object, the function loops through the MORPHEMES file and compares the series of letters to the morphemes in the MORPHEMES file to determine whether the series of letters qualifies as a morpheme. As used herein, the term "loop" refers to iterating through values of a variable and performing an action for each of those values. While performing the loop, if any single letter is not part of any series of letters that qualifies as a morpheme, then that search is considered gibberish (e.g., not sensible). To that end, all information that relates to the query is removed. For example, the search object, the location of the search, the results obtained, the quality of the results, etc., are discarded.

For example, consider the series of consecutive letters "LOWER." Each letter of the term is looped through and determined whether it exists. In this example, the loop starts with the letter "L" then loops to "LO;" then "LOW;" which is a morpheme (so L, O, and W belong to a morpheme). The loop continues with "LOWE" and then "LOWER" is checked, (E, and R are included in the morpheme "LOWER"). If the string is changed to "LOWXER," the string will be considered as nonsense because X does not belong to a sequence of letters that create a morpheme. However, if a morpheme combination is created that is not a word, (like LOWTOPPER), it will be considered a unique morpheme combination since every individual letter is contained in a morpheme even though the combination does not form a dictionary word.

In step 316 searches that include entries from a list of proper nouns are filtered out (e.g., discarded). In one embodiment, the analysis server 150 has stored therein an electronic proper noun file 324 configured to be used as a reference in step 316. Searches that include proper nouns may relate to specific people or places, and therefore are not likely to provide insight into concepts, products, services, or improvement thereof that are at the cusp of creation.

In step 318, searched phrases that include combinations of morphemes (e.g., meaningful units of language that cannot be further divided, such as "pre," "bi," or full words such as "dog") that do not form dictionary words (e.g., "beachlike") are awarded score, since such non-word morpheme combinations often indicate originality. In another example, if a continuous substring (e.g., single word) in the searched phrase is a combination of two or more elements from morphemes that do not provide a dictionary term, the term is awarded score. Thus, morphemes are compared to pre-existing (e.g., morpheme, dictionary, etc.,) terms. The pre-existing terms may be stored in the in the analysis server 150. As discussed above, every search has a running score, which may start at zero. Every time a search object exhibits a positive trait in a filtration step, additional points are added to that search's running score. If the search does not exhibit a positive trait at a step, additional points are not added in that step. If the search object demonstrates a negative trait, its aggregate score is reset to zero and the search object may ultimately be discarded.

Thus, lexicographical analysis is performed on phrases that were used to search the Web for the purpose of identifying phrases that include lexicographical cues of novelty and/or innovation. Accordingly, insight is provided into concepts, products, and/or services that are at the cusp of creation.

In one embodiment a targeted word search is performed (i.e., step 320) based on predetermined words and/or phrases. The targeted words may be provided by a separate target words file 327 stored in the analysis server 150. If any sub-string in the searched phrase string forms an element that is targeted, that search is awarded score. For example, if mechanical watches are targeted, and a user performs a search for a "mechanical watch with a plastic movement," such string would be awarded a higher score. Thus, predetermined words and/or phrases are given special emphasis for scoring purposes.

In another example, searched phrases that begin with the word "does" and end with the word "exist?" are awarded score, since these searched phrases are likely to include a concept that may be novel, such as "does a gun that shoots flavored water exist?" Each search term is compared to a set of predetermined terms that may be stored in a memory of the analysis server 150. A score is assigned to the search term based on how many terms are found in the predetermined terms.

Figure 3B:
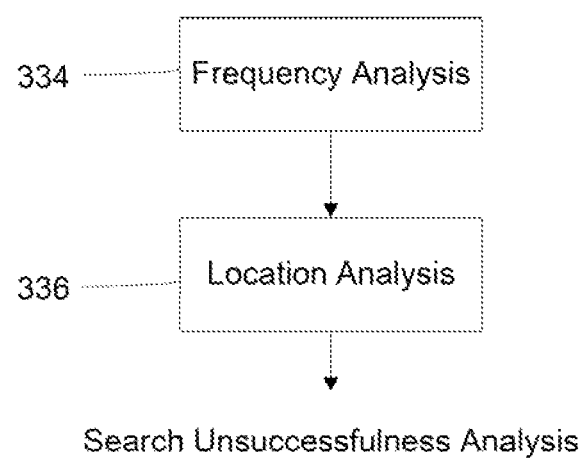

In one embodiment, frequency and/or location based analysis is performed. To that end, FIG. 3b illustrates a flow of a frequency and/or location based analysis (i.e., second stage) of an exemplary embodiment. In step 332 a frequency analysis is performed. More particularly, the frequency at which a search object is queried on the Web in a predetermined time period (e.g., week, day, etc.) is evaluated. The search objects need not be identical; rather, they may be substantially similar. In one embodiment, a function (e.g., COMPARE.fn) configures the web monitor 140 to receive the array of all the searched phrases in GUSD and compare each phrase, one at a time, to every other searched phrase in the file. Two search objects may be deemed adequately similar if at least one of the following conditions is satisfied: (1) The search objects are identical; (2) A threshold percentage of words (strings separated by spaces) in one search are included in the other search, the number of additional words in the second search is limited to a maximum predetermined number, and a threshold percentage of the words are assembled in the same order in both search objects; (3) The case of 2, but a specified number of words in the first search are not exactly the same words contained in the other search, but modified by the addition of another morpheme (Step 334). In this regard, the COMPARE.fn function may be used.

An electronic matrix file is created (e.g., SIMILAR) in which the element in position (i,j) takes the value 1 when the $i^{th}$ search object is adequately similar to the $j^{th}$ search object.

For example, the matrix may be created by the COMPARE function by using a nested loops. In one implementation, the function starts with the value 1 (i=1) and counts up until i=number of searches. Within every iteration for i, the function loops through the same values for j, starting with j=1 and continuing until j=the number of searches. The number i refers to the index of the search being considered, while the number j refers to the index of the other search in the list that the $i^{th}$ search is being compared to in that iteration. The function compares the $i^{th}$ search to the $j^{th}$ search based on the criteria 1 to 3 discussed above, and if the searches are deemed adequately similar, the function enters the value 1 in element [i, j] of the matrix in the SIMILAR file (in the space in the ith row and jth column). If search j is not deemed similar to search i, zero is entered in the element (i, j) of the SIMILAR file. The main diagonal of SIMILAR will thus be populated with the value 1, since i=j along the main diagonal, when the function is comparing the searched phrase to itself.

The frequency of the $i^{th}$ search in GUSD is the sum of the ith row in SIMILAR. Score is awarded based on the desired preprogrammed results in the web monitor 140 and/or the analysis server 150. For example, if searches that are unique are sought, then score is only awarded to search objects whose row in SIMILAR sum to 1. If a concept that appears in approximately 0.01% of the searches is sought, score is awarded to searches whose entry in the SIMILAR file sums to a value close to 0.0001× number of searches. If a popular search is sought, score is awarded to searches with the highest summing rows in the electronic SIMILAR file. The frequency target, may be altered by the operator of the web monitor 140 and/or analysis server 150 to target searches with different frequency profiles, to achieve the desired filtration results. Thus, the number of times in a predetermined period a similar combination of morphemes is determined. A score is assigned based on this number.

If a threshold is met, the search object is promoted to the next step. Otherwise, the search object may be discarded. The threshold may be adjusted based on the concepts, products, and/or services that are being sought and/or monitored. For more unconventional concept, the threshold may be set to a low number (e.g., ≤3/month). For a more conventional concept, the threshold may be set much higher (e.g., ≥50/month).

Thus, the frequency filtration and scoring can be set to select for less commonly searched concepts, products, and/or services. If a more prevalent insight that is shared among numerous individuals but not present in the market is the target, the frequency scoring stage can be set to select for more commonly entered searches.

In one embodiment, a location based analysis performed in addition to or instead of the frequency analysis (Step 336). The location information may be based on the location from which the search was performed and/or the location targeted in the search. For example, a searched performed from Manhattan or even a specific zip code may be valued more than other locations. The location information is part of the input file that includes the harvested search objects. In another embodiment, searches that target a specific location are given emphasis (i.e., higher score). For example, the string "is there a <specific product or service> in the East Village" may receive a higher score, because it indicates a geographic specific market demand.

In one embodiment, an electronic location array (e.g., LOCATION), a correspondence matrix (e.g., SIMILAR), and the function DISPERSION.fn, (stored in the web monitor 140 or the analysis server 150) determine the geographic dispersion of similar searches. For example, the web monitor 140 reads the IP address of the user for each search and assigns a USER ID, which is arbitrary, and REGION number, which is based on the geographic location of the user. The geographic location from which the IP address of a searcher originates is commonly retrieved and employed to generate search engine results. The web monitor 140 retrieves the location of the user and assigns to that search a region number based on a pre-existing region map, saved in the web monitor 140, in which region numbers may be assigned to geographic areas sequentially, such that regions close in number are close geographically.

As the web monitor 140 populates the GUSD file, the region number of each search is determined and entered in its REGION data field in the GUSD. The array REGIONS is simply the column of GUSD containing all of the search region numbers, the $i^{th}$ region number corresponding to the $i^{th}$ search in GUSD and all other arrays. The function DISPERSION.fn compares the region numbers of similar searches to calculate and assign to each search a geographic dispersion factor. The analysis server 150 loops through all searches. For each search i, the $i^{th}$ row of the matrix in the SIMILAR file and the array REGIONS are sent to the DISPERSION function. DISPERSION.fn running on the analysis server 150 configures the analysis server to calculate a value similar to the standard deviation of the region numbers whose indices were indicated by the value 1 in the row of SIMILAR. In other words, for every search, if the $1^{st}$ number in that search's row of SIMILAR is a 1, then the first region number in REGIONS is considered in the DISPERSION calculation. If the $2^{nd}$ element in that search's row of SIMILAR is also 1, then the $2^{nd}$ region number in REGIONS is also considered in the DISPERSION calculation; otherwise, if the second element in the ith row of SIMILAR is a zero, that region number is not considered in the DISPERSION calculation because that search was not similar to the $i^{th}$ search, as indicated by the $2^{nd}$ element in the $i^{th}$ row of SIMILAR being a zero. Thus, for each search, the regions of all similar searches are compared by DISPERSION.fn, and the dispersion factor is entered into the corresponding element of the array DISPERSION. In one embodiment, every member of a family of similar searches will have the same dispersion factor. Also, a higher score may be awarded to the search object that is within predetermined location(s). In this regard, the location information for a search object provided in the GUSD is compared to an electronic file that includes preferred and/or disqualifying locations. The electronic file may be stored in a memory of the analysis server 150.

Figure 3C:
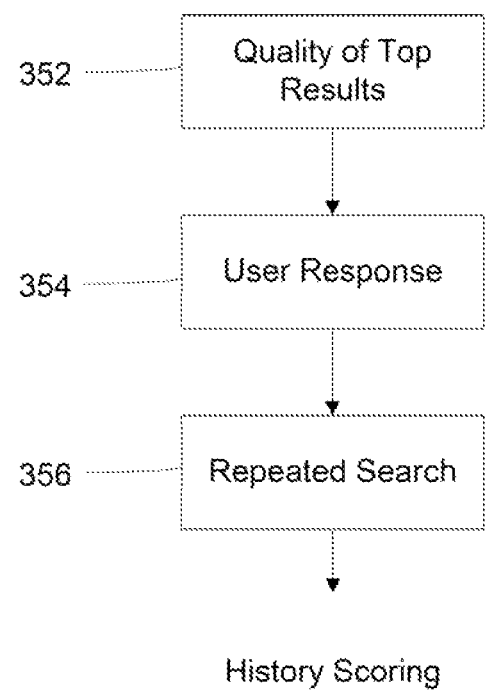

FIG. 3c illustrates a flow of data analysis based on unsuccessfulness of a search result (e.g., third stage). In step 350 the unsuccessfulness of a user search object is evaluated where score is awarded to searches that provided results that did not meet one or more predetermined criteria. Failure to meet the predetermined criteria may be indicative that the search results likely did not provide satisfactory results. The unsuccessfulness may be determined based on a low average quality of top results (AQTR), few clicked results, and repeated searching within a predetermined time, discussed in more detail below.

In step 352, the quality of the top predetermined number of results n (e.g., Web pages) for each search object is evaluated. For example, the analysis may focus on the top 10 results. However, if fewer than the predetermined number of results is returned to the user in the GUSD, the results returned (e.g., SERPs) are evaluated.

In step 352 the quality of the search results may be determined by the page ranking system of the search engine (e.g., web monitor 140). Every popular search engine uses a type of web site quality scoring systems to rank pages and return to the searcher an ordered list of the top-scoring and most relevant results. This search result scoring system may be based on several factors: traffic a website receives, number of other websites that include links to them, the score of those linking websites, and in some cases, user location and search history. The quality scores assigned to the websites returned as top results to the user are logged by the web monitor 140. When generating the electronic GUSD file, the Web Monitor calculates the average quality of the top specified number of results and enters that value into the AQTR data field of the GUSD file for that search. Basically, the page ranking system of the search engine is re-purposed to generate this AQTR score for each search. A high AQTR score indicates a successful search, or that the internet satisfied the user's query. A low AQTR is a targeted search feature, as it indicates that the user's search was not met with a popular internet destination to satisfy that demand, or that the user is searching for a product that does not yet exist on the market.

In one embodiment, the average quality of the top N results is calculated by the web monitor 140. Different scores are assigned to each search based on the values obtained. For example, if A≤AQTR≤B, it is indicative that the search results obtained were of poor quality. In this regard, a first score is assigned to the search query. If B≤AQTR<C, where C>A, it may indicate that the search result was not poor but still below average. In this regard, a second score is assigned to the search query, and so forth. The more poor the search result, the higher score is assigned to the search. For example, a poor result is indicative that a concepts, products, and/or service that one or more users are searching the web are not accommodated by the market and may therefore be at the cusp of creation.

In step 354, the user response to the search results is analyzed. For example, if the user performing the web search does not click any of the results generated by the search engine, the web monitor 140 records that the number of links clicked for that search is zero. If the user clicks on one of the links without returning to the search results page, the web monitor 140 records a zero for number of results clicked for that search. If the user returns to the search results page multiple times and clicks on multiple results, the number of results clicked is recorded for that search. When the GUSD file is assembled, the number of results clicked (e.g., selected) is entered into the Number of Results Clicked data field for every search. Searches with zero results clicked are deemed the most unsuccessful, and are awarded score accordingly.

In step 356, a repeated search analysis is performed. For example, a repeated entry of similar search phrases in a short predetermined time period (e.g., 100 seconds) by the same user (e.g., based on the USERID) is indicative that the subject matter searched is not available. In this regard, additional points are assigned to this search object. The similarity of the searched string is determined by the function COMPARE.fn, and all similar searches are indicated by the rows of the matrix SIMILAR.

The program configures the analysis server to loop through all searches. For each search i, for all similar searches indicated by the ith row in the matrix SIMILAR, if the USER ID of the similar search is the same as that of search i, and if the time step of search i is sufficiently close (e.g., within a predetermined time) to that of the similar search, award score to the search. For example, when the program is considering the $100^{th}$ search in GUSD, it considers the $100^{th}$ row in the matrix SIMILAR. If the $5^{th}$ and $213^{th}$ element in that row of the matrix SIMILAR are 1 (instead of zero, then the $5^{th}$ and $213^{th}$ search are similar to the $100^{th}$ search. The user IDs and time stamps of the similar searches are compared, and if the similar searches were conducted by the same user and within a predetermined time, it is indicative of a repeated search, and score is awarded to the search: add to the element in the SCORES array that corresponds to that search. Accordingly, scores are awarded based on at least (i) the quality of the search results, (ii) user response, and (iii) repeated search performed by the user.

Figure 3D:
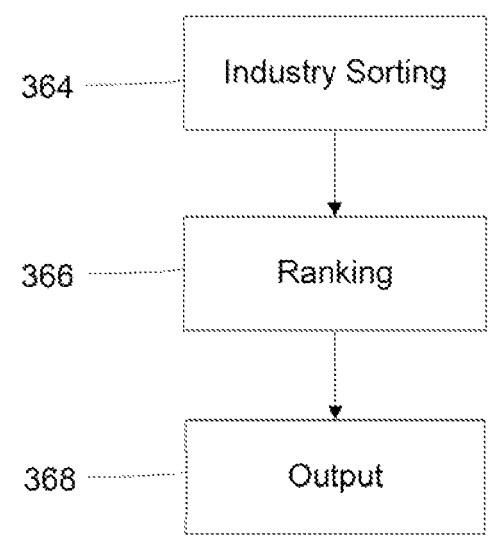

In one embodiment, the method enters an optional fourth stage to perform a more focused search. In this regard, FIG. 3d illustrates additional post processing of the search results based on prior search results, consistent with an exemplary embodiment. The analysis server 150 has stored in its memory location information of prior search results that have received a score that is above a predetermined threshold.

The location information may be a particular area (e.g., city), zip code, or an IP address. For example, whenever a search object achieves an aggregate score that is above a predetermined threshold, the location information is stored in a memory of the analysis server 150. That is because, the method has identified that location (e.g., area, zip code, IP address, etc.) to be an innovative hub. Subsequent searches from the same location are assigned a higher score in subsequent searches. Thus, history information is used to identify trend setters and to evaluate a present set of collected Web data.

In one embodiment, additional industry sorting is performed (i.e., step 364). In particular, search objects are categorized with respect to their likely industry. For example, Web searches related to vehicles are sorted in an electronic "vehicle" file, while Web searches related to apparel are sorted in an electronic "apparel" file. In one embodiment, if a search object falls under multiple categories, the string is placed in the multiple files, respectively. The industry from each search object is determined from the morpheme content of the search object.

In step 366, each group of similar search objects is ranked according to the cumulative score acquired in the filtration process (e.g., stages 1 to 4.) The scored and categorized searches are ranked by score, assembled, and saved in the memory of the analysis server 150.

In one embodiment, the analysis server 150 includes a list of subscribers that have subscribed to receive the information compiled by the analysis server 150. To that end, in step 368 the ranked results are sent (e.g., electronically via the internet 120 or through regular mail) to the subscribers at a predetermined time (e.g., weekly, daily, as soon as an industry specific result is obtained, etc.).

It will be understood that the flow in FIGS. 3a to 3d are merely examples and can of course be performed in other orders or with more steps. Based on the concepts discussed herein, it will be understood that additional stages of filtration may be introduced to accommodate different applications.

It may be helpful now to consider a high-level discussion of an example of a computing device identifying a concept of a good or service for an unmet market potential. For example, the popular video game "Guitar Hero," in which players use a guitar-shaped game controller to simulate playing an electric guitar across various rock music songs, could have been identified as an unmet market potential by the system described herein years in advance.

Initially, one or more individuals may have queried the WEB with one or more search phrases similar to the following on their computing device Data:
"Does a Guitar videogame controller exist?"
"Guitar Center Cambridge"
"Jimi Hendrix guitar solo"
"Game with guita-controller"
"Play Station Guitar Solo"
"Video Street Guitar Festival"
"Is there a Guitar Video Game Controller?"
"Guitar Video"
"New guitar control"

The web monitor reads the search objects received from the computing device of the user and searches for information on the Web to accommodate the query. Ultimately, a GUSD is created that includes the information related to the search objects that is received by an analysis server.

Morpheme Filtration and Scoring:
Proper Noun Filtration:
A proper noun filtration is performed. For example: "Jimmy Hendrix Guitar Solo. Guitar Center Cambridge."

Scoring:
The search object "Does a Guitar videogame controller exists?" is awarded extra points for the specific word "exists." Words such as "exist" "is there a . . . ?" and "new" are given a higher score because the search itself implies a market demand and a concept or product that is at the cusp of creation.

In one embodiment, search phrases that include a combination of morphemes but do not form grammatically correct words are also scored higher. In this example, "guitar-controller" is scored higher than "guitar control." Though both search entries combine almost identical morphemes, the lack of existing words in the first search further indicates a concept or product that is at the cusp of creation.

Geographic Dispersion Filtration and Scoring:
Next, the geographic dispersion associated with the search object is analyzed.

Proper Noun Filtration:
Certain predetermined results are disqualified. For example, for "Video Street Guitar Festival," all searches originating from Nashville, due to a guitar festival on video street) are disqualified.

Scoring—
Search entries that have a higher degree of geographic scatter are given a higher score.

Search Success Rate:
Each data entry is provided a score based on "unsuccessfulness" of the search result. Searches that yield little result or results that are not very accurate (e.g., of low quality) are scored higher. In one aspect, this scoring approach allows the data entries that pass all the other layers of filtration, but do not yield a tangible result, to be given a higher score.

Clicked Results:
Each data entry may now be also scored based on clicks in the results yielded. If the GUSD indicates that the user had performed many searched, but had spent little time on the pages themselves, the search object is scored higher, indicating that the user cannot find what they are looking for. If a user did not click many icons, and spends significant time on the resulting pages, this would indicate the user found what he or she were looking for, yielding a lower score.

Industry Specific Sorting:
In this example, the following phrases are grouped into the "Digital Entertainment Industry" bundle: Does a Guitar videogame controller exist? Guitar Center Game. Play Station Guitar Solo. Video Street Guitar Festival. Is there a Guitar Video Game Controller? This sorting removes phrases such as "guitar video" or "new guitar control," because they are not part of the digital entertainment industries predetermined list of morphemes.

Output:
"Does a Guitar videogame controller exists?": Searched x times, with a geographic dispersion of y, and an average quality of top results z.

Result:
Thus, based on the concepts discussed herein, the guitar controller, interactive music, the scoring on notes, the whole idea of "Guitar Hero" could have been identified as a concept or product that is at the cusp of creation. Thus, the product could have been developed by another company to more expeditiously meet approaching market demand. Indeed, the technology to develop guitar hero may have been available in the 1980's, however, it wasn't brought to life until the 2000's.

As shown by the above discussion, functions for monitoring the Web for the searches performed by the computing devices, determining the quality of the individual and aggregate of the search results and performing various stages of filtration, include one or more servers such as the web monitor 140 and analysis server 150, as shown in FIG. 1. Although special purpose devices may be used, such devices also may be implemented using one or more hardware platforms intended to represent a general class of data processing device commonly used to run "server" programming so as to implement the search data gathering and filtration functions discussed above, albeit with an appropriate network connection for data communication.

Figure 4:
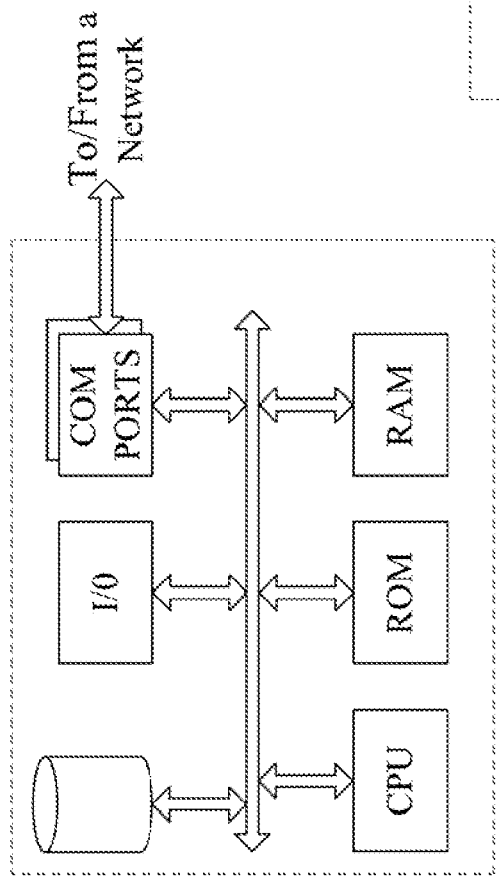
FIG. 4 illustrates a network or host computer.
Figure 5:
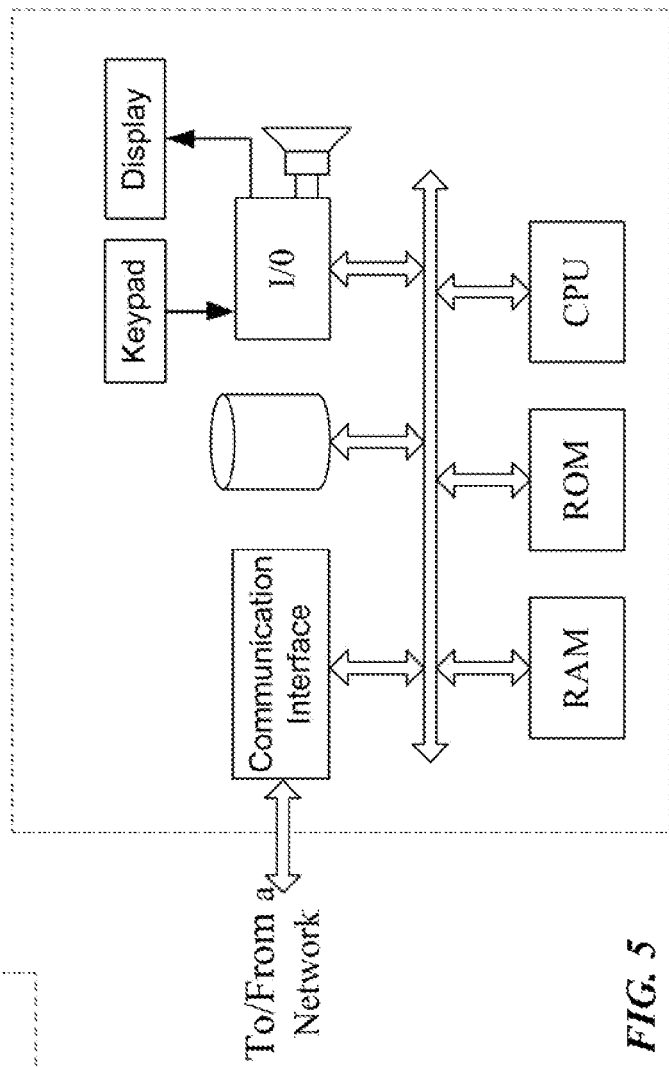
FIG. 5 illustrates a computer with user interface elements.

FIGS. 4 and 5 provide functional block diagram illustrations of general purpose computer hardware platforms. FIG. 4 illustrates a network or host computer platform, as may typically be used to implement a server. FIG. 5 depicts a device with user interface elements, as may be used to implement a personal computer, such as computer 102e of FIG. 1 or a workstation, or to implement a computing device, such as a portable handset, a smart-phone, tablet computer, a personal digital assistant or other type of mobile station or mobile terminal device (e.g., devices 102a to 102e of FIG. 1), although the device of FIG. 5 may also act as a server if appropriately programmed. It is believed that the general structure and general operation of such equipment as shown in FIGS. 4 and 5 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run server programming, for example, to receive search queries from one or more computing devices (e.g., 102*a* to 102*e*), gather data, and then analyze and filter the data, as discussed herein. The web monitor 140 and analysis server 150 have been referred herein as servers by way of example only. It will be understood that any appropriately configured computing device can be used as well.

The software functionalities involve programming, including executable code as well as associated stored data, e.g., files used for applications on the server (e.g., computing device) to receive and/or gather Web search query information, send the gathered information for further analysis, and analysis of the gathered information. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of monitoring Web searches, sorting information, and performing filtration of the data in essentially the manner performed in the implementations discussed and illustrated herein.

Hence, aspects of the methods of receiving and processing search query information as outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein.

The components, steps, features, objects, benefits and advantages that have been discussed herein are merely illustrative. None of them, nor the discussions relating to them, are intended to limit the scope of protection. Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, although stages "1" to "4" were discussed, they can be performed in any order.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A computing device configured to identify a concept of a good or service for an unmet market potential, the device comprising:
    a hardware processor;
    a non-transitory storage device;
    a program stored in the storage device; wherein execution of the program by the processor configures the computing device to perform functions, including functions to:
    read a Global User Search Data (GUSD) comprising information related to a search object;
    determine an un-successfulness of the search object;
    assign a first score based on the unsuccessfulness; wherein a higher first score is assigned the more un-successful the search object is;
    determine from the GUSD one or more locations from which similar search objects originated;
    assign a second score based on a geographic dispersion of the one or more searcher locations, wherein a higher second score is assigned the higher the geographic dispersion of the one or more locations:
    identify a morpheme combination in the search object from the GUSD;
    compare the morpheme combination to a first set of pre-existing terms;
    assign a third score to the search object based on the comparison, wherein a higher third score is assigned if the morpheme combination is not found in the first set of pre-existing terms;
    compare an aggregate of the first score, reflecting the un-successfulness of the search object, the second score, reflecting the geographic disparity of the one or more locations from which the similar search objects originated, and the third score, reflecting the likelihood that the morpheme combination is not found in the first set of pre-existing terms, for a search term to a predetermined threshold; and
    identify the search term as indicative of the concept of good or service for an unmet market potential if the aggregate of the first score, the second score, and the third score is above the predetermined threshold.

2. The computing device of claim 1, wherein execution of the program further configures the computing device to perform functions to: discard the GUSD for search objects that include a proper noun.

3. The computing device of claim 1, wherein execution of the program further configures the computing device to perform functions to: compare each term of the search object to a set of predetermined terms; and assign a fourth score based on how many predetermined terms are found in the set of search terms, wherein a higher fourth score is assigned the more predetermined terms are found in the set of search terms.

4. The computing device of claim 1, wherein execution of the program further configures the computing device to perform functions to: Determine from the GUSD a number of times in a predetermined period a similar combination of morphemes is found and assign a fifth score based on the number of times in the predetermined period the similar combination of morphemes is found, wherein a higher fifth score is assigned the lower the number of times in the predetermined period the similar combination of morphemes is searched, and a lower fifth score is assigned the higher the number of times in the predetermined period the similar combination of morphemes is searched.

5. The computing device of claim 1, wherein execution of the program further configures the computing device to perform functions to: Determine from the GUSD a number of SERPs selected and assign a sixth score based the number of SERPs selected, wherein a higher sixth score is assigned the lower the number of SERPs selected, and a lower sixth score is assigned the higher the number of SERPs selected.

6. The computing device of claim 1 wherein execution of the program further configures the computing device to perform functions to: Compare the location to a set of predetermined locations; and Assign a seventh score if the location is found in the set of predetermined locations.

7. The computing device of claim 1, wherein the GUSD comprises at least one of: i) the search object; ii) a location from which the search was performed; iii) an average quality of a predetermined number of top search engine results pages (SERP) related to the search object; ix) an identification of a computing device originating the search object; v) one or more SERPs selected; vi) a number of SERPs selected; and vii) a time stamp of when the search object was entered into the computing device originating the search object.

* * * * *